(12) United States Patent
Fernald

(10) Patent No.: US 7,668,607 B1
(45) Date of Patent: Feb. 23, 2010

(54) ACCURATELY SETTING PARAMETERS INSIDE INTEGRATED CIRCUITS USING INACCURATE EXTERNAL COMPONENTS

(75) Inventor: Kenneth W. Fernald, Austin, TX (US)

(73) Assignee: Zilker Labs, Inc., Austin, TX (US)

( * ) Notice: Subject to any disclaimer, the term of this patent is extended or adjusted under 35 U.S.C. 154(b) by 346 days.

(21) Appl. No.: 11/846,178

(22) Filed: Aug. 28, 2007

Related U.S. Application Data

(62) Division of application No. 11/361,108, filed on Feb. 24, 2006, now Pat. No. 7,292,019.

(60) Provisional application No. 60/723,282, filed on Oct. 3, 2005.

(51) Int. Cl.
*G05B 13/02* (2006.01)
(52) U.S. Cl. .......................................... 700/52; 700/28
(58) Field of Classification Search ................ 700/28, 700/52
See application file for complete search history.

(56) References Cited

U.S. PATENT DOCUMENTS

| | | | |
|---|---|---|---|
| 4,118,700 A | 10/1978 | Lenihan | |
| 4,349,777 A | 9/1982 | Mitamura | |
| 4,755,793 A | 7/1988 | Neidorff | |
| 5,886,581 A | 3/1999 | Hugel et al. | |
| 6,393,378 B2 | 5/2002 | Manning | |
| 6,407,621 B1 | 6/2002 | Enriquez | |
| 6,744,244 B2 | 6/2004 | Liu et al. | |
| 6,836,430 B2 | 12/2004 | Wuidart et al. | |
| 6,978,428 B2 | 12/2005 | Saxon et al. | |
| 7,178,113 B2 | 2/2007 | Bardouillet et al. | |
| 7,292,019 B1 * | 11/2007 | Fernald | 323/354 |
| 2003/0151942 A1 | 8/2003 | Bardouillet et al. | |

* cited by examiner

*Primary Examiner*—Jeffrey L Sterrett
(74) *Attorney, Agent, or Firm*—Meyertons Hood Kivlin Kowert & Goetzel, P.C.; Jeffrey C. Hood

(57) ABSTRACT

The control precision of one or more parameters of an integrated circuit (IC), for example the output voltage of a voltage regulator comprised in the IC, may be improved even when using inaccurate components external to the IC. Control of the output voltage, or any parameter, using components external to the IC may include coupling a resistor to the IC and measuring the actual resistance value of the resistor, and based on the measured value, selecting a nominal resistance value from a set of resistance values previously specified by the user. The output voltage, or parameter, may be generated according to the nominal resistance value instead of the actual resistance value, thereby reducing the error that may be incurred due the actual resistance value of the resistor not matching the expected nominal value of the resistor. The difference between each adjacent resistance value in the set of resistance values may be selected to be greater than the greatest measurement error that may be incurred during measuring the actual resistance value.

14 Claims, 5 Drawing Sheets

ACCURATELY SETTING PARAMETERS INSIDE INTEGRATED CIRCUITS USING INACCURATE EXTERNAL COMPONENTS

PRIORITY CLAIM

This application is a divisional application of U.S. patent application Ser. No. 11/361,108 titled "Method for Accurately Setting Parameters Inside Integrated Circuits Using Inaccurate External Components", filed Feb. 24, 2006 now U.S. Pat. No. 7,292,019, whose inventor is Kenneth W. Fernald, which claims benefit of priority of U.S. provisional application Ser. No. 60/723,282 titled "System and Method for Implementing Distributed Power Management", filed Oct. 3, 2005.

BACKGROUND OF THE INVENTION

1. Field of the Invention

This invention relates to power converters and, more particularly, to incorporating power-management functions in power converters.

2. Description of the Related Art

From 1995 to 2001, the highest density processors from manufacturers such as Intel went from a power consumption rate of about 30 Watts at 3.3 V to a power consumption rate of about 90 Watts delivered at 1.5 V. A simple application of the power-voltage-current relationship reveals that the total current consumed by these chips has increased from nine amps to about 60 amps in a very short time period. There are similar analogies with all larger digital integrated circuits (ICs).

This rapid evolution has created new and significant problems in delivery of the power to and removal of waste heat from these ICs. Power supply design is now a much more critical and difficult task than it was a few years ago. High-current/low-voltage ICs require a very clean and stable source of DC power. The power source must be capable of delivering very fast current transients. The electronic path to these loads must also have low resistance and inductance (a 1.5V supply would be completely dropped across a 25 mΩ resistance at 60 Amps).

Traditionally, DC power supplies were designed to convert AC line voltage to one or more DC outputs that would be routed throughout a system to the points of load (POL). FIG. 1 is an illustration of a prior art power distribution system. As shown in FIG. 1, a power distribution scheme 100 may comprise an AC to DC converter 102 generating output voltages V1, V2, V3, and V4 that may be distributed to various point of load devices (POLs). However, it may not be practical to route high-current signals throughout a system.

To overcome this difficulty, and to reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA, and is illustrated in FIG. 2. As shown in PDA system 200 of FIG. 2, an AC to DC voltage converter 202 may produce an intermediate DC voltage Vx, which may be routed to individual local DC to DC converters 204, 206, 208, and 210, which in turn may provide the required DC voltages V1, V2, V3, and V4, respectively, to their corresponding POLs. With a DPA, errors may be reduced since the distance traveled by a high-current signal is minimized, thus reducing I×R (resistive) and L di/dt (inductive) errors.

In many power distribution systems it is typically not enough to just distribute power around a system to the various POLs. Complex electronic systems are generally monitored and controlled to ensure maximum reliability and performance. Functions (power supply features) typically implemented in DPA systems are listed below.

Supply Sequencing

A modern electronic system can contain many ICs and each IC can have several supply voltage requirements. For example, core logic may require one voltage and the I/O may require a different voltage. This typically results in a need for setting the order in which the voltages on a single chip are applied and the order in which the chips in a system are powered up.

Hot Swap

Many electronic systems, including computers, telecom racks, storage devices and battery-operated devices require "hot swap" capability. Hot swap capability typically comprises the live attachment of a device to power, i.e., attaching a device to a system that is powered up (without having to power down the system prior to the attachment). Examples of hot swap events may include installing a battery in a PDA or plugging a USB device into a computer.

Ramp Control

It is sometimes necessary to control the rate at which the DC output voltage of a converter ramps from its initial value to its nominal value. This may be done in support of managing a hot-swap event, sequencing requirement or satisfying the requirements of the load.

Voltage Programming

The final voltage presented to a load may need to be programmed to the desired value or may need to be "trimmed" to a precise value. Some systems require active voltage programming of devices during their use.

Load Monitoring

In order to maintain high reliability of an electronic system, monitoring of load status is sometimes required. Both current and voltage may need to be monitored and action may need to be taken based on the load status measurements. Current and voltage may also need to be monitored for undershoot and overshoot conditions. In some systems, when an error is detected, the system may take corrective action by switching the load off, isolating the load or just setting a system flag.

Tracking

Many times it is desirable to have the output of one more converters follow, or mirror, the output of one or more other converters in the system. Tracking a specific voltage level, for example, may include setting the voltage level of a tracking converter or device to the voltage level of a tracked converter or device, and changing the voltage level of the tracking device to match the voltage level of the tracked device any time the voltage level of the tracked device changes. In some cases the voltage levels of tracking devices and tracked devices may not be the same; changes in the tracked voltage level would simply be mirrored in the voltage output of the tracking devices. For example, if the tracked voltage increases by 0.2V, the tracking voltage would also increase by 0.2V.

Temperature Monitoring

Dense electronic systems often generate excessive waste heat. The excessive heat generally needs to be removed in order to keep the electronics operating at their safe operating temperature. Therefore, the temperature of individual loads as well as the temperature of various locations within the system's enclosure is typically monitored. When temperatures reach unacceptable limits, action may need to be taken locally and/or at the system level. Such corrective actions often include turning on or speeding up fans, setting an alarm or simply shutting down the power to the problematic load. Temperatures can be measured using several methods. Some large digital processors sometimes incorporate embedded temperature sensor diodes on chip. Other systems may employ thermistors and IC temperature sensors.

Fan Speed Control

In conjunction with temperature monitoring it is often necessary to monitor and control fan speed. This may be done to control airflow or to control acoustic noise.

Phase Control

DC voltage is typically stepped down in one of two ways, linear regulation and DC-to-DC conversion. DC-to-DC converters may step down DC voltage by pulse width modulation (PWM) of an input voltage and passive filtering of the output. The duty cycle of the PWM signal generally approximates the ratio of output voltage to input voltage divided by the efficiency of the converter. For example, for an ideal DC-to-DC converter with a desired output of 1.2V and an input of 12V, the duty cycle would be 10%. In high current applications, it is often desirable to force the various DC-to-DC converters to sample different "phases" of their clock cycle. That is, to prevent DC-to-DC converters in a system from all sampling the first 10% of a clock cycle, one converter may sample the first 10% of the clock cycle and the next converter may sample a different 10% of the clock cycle, and so on. This typically reduces noise and improves transient response. This technique is also used in motor control and is often implemented to control multiple fans in a system. PWM controlled fans with staggered phase typically offer reduced acoustic noise.

Current Sharing

In addition to forcing DC-to-DC converters to sample staggered phases of the switching clock, it is sometimes desirable to force two or more independent converters to each deliver an equal share of the load current. This approach provides improved noise and transient response in high-current applications.

Programmable Switching Frequency

Certain DC-to-DC converters feature programmable switch frequencies. Frequencies may be selected based on several system concerns.

Synchronization of Switching Clocks

It is often desirable to synchronize the switching frequency of DC-to-DC converters in a system to each other or to some other system clock. This is typically performed to reduce the probability of mixing the clock or its harmonics with important system clocks. It is of particular interest in communication applications.

There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement gluelogic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system.

In an effort to tie all or most of these functions together at the system level, one approach has been to implement the functions in control ICs responsible for controlling respective POL converters. Some of the functionality may also be programmed into a microcontroller that may communicate with attached POL converters over an I2C (inter-IC communication) bus to coordinate control of all POL converters in the system. FIG. 3 illustrates an example of an I2C-based system. As shown in FIG. 3, a microcontroller 302 may be coupled to POL converters 320, 322, 324, and 326, with the connections between the devices representing an I2C bus. A configuration as shown in FIG. 3 is typically not suited for active control and is used mainly for status monitoring, where POL converters 320, 322, 324, and 326 may send a status signal back to microcontroller 302, which in turn may send a simple control signal to a respective POL converter based on the status information received from the respective POL converter. In general, microcontroller 302 checks status for one POL converter at a time, which may be viewed as a disadvantage when more interactive, real-time communication is desired in a system.

FIG. 4 illustrates one example of a single function implemented in a DPA system. Typically, a supply controller 350 (providing control for executing the function) and DC-to-DC voltage converters 352, 354, 356, and 358 are connected in a point-to-point configuration as shown. Supply controller 350 is coupled to each DC-to-DC converter over dedicated lines, (typically analog lines are used for implementing most functions), more specifically over lines 372 and 362 to converter 352, lines 374 and 364 to converter 354, lines 376 and 366 to converter 355, and lines 378 and 368 to converter 358. Input supply voltage VIN 360 is coupled to each DC-to-DC converter, and in turn DC-to-DC converter 352 may produce, for a respective POL or POLs, DC output voltage 370, DC-to-DC converter 354 may produce DC output voltage 372, DC-to-DC converter 356 may produce DC output voltage 374, and DC-to-DC converter 358 may produce DC output voltage 376.

With increasing levels of integration of components and functionality inside ICs, it has become desirable to configure the ICs to perform different functions using complex digital parameter control, for example a microcontroller with associated software. In a variety of situations, a simple user control interface on an IC may be required when access to the program inside the IC is limited. A simple example would be the control of the output voltage of a voltage regulator such as the voltage (or POL) converters shown in FIGS. 2, 3 and 4. Typically, such control can be achieved by using control bits or resistors as shown in FIGS. 5 and 6.

As shown in FIG. 5, for example, the control of eight different output voltage settings to obtain output voltage 558 typically requires three control pins shown as inputs 552, 554, and 556 to IC 550. Increasing pin count may become expensive due to the increase in die area and package size. Also, with increasing number of output voltage settings, digital control generally becomes impractical without the use of a complicated digital bus structure. FIG. 6 shows a typical analog method to control the output voltage at node 660. Here Vout=Vref*(1+R1/R2), where Vref is a reference voltage. Using 5% resistors for R1 654 and R2 656 would result in approximately 5% inaccuracy in the output voltage at node 660. The output voltage at node 660 can generally be programmed to practically any value by proper choice of resistors 654 and 656. However, accuracy may be sacrificed by the variation in the values of resistors 654 and 656. This often results in the need to use more expensive high-precision resistors.

Many other problems and disadvantages of the prior art will become apparent to one skilled in the art after comparing such prior art with the present invention as described herein.

SUMMARY OF THE INVENTION

In one set of embodiments, a nominal resistor value for generating a specific output voltage may be selected from a set of user specified nominal resistor values. The nominal resistor values may correspond to values of commercially available resistors that may physically be included in a voltage converter circuit. In one embodiment, an integrated circuit (IC) may be configured to accurately control the output voltage using a single external resistor. The IC may be configured to measure the actual value of the external resistor, and, from the actual value of the external resistor, determine which of the specified nominal resistor values was intended to be used in generating the output voltage. The intended, or "ideal" (i.e. nominal) resistor value—rather than the actual value of the external resistor—may then be used to control the output voltage. The set of specified nominal resistor values may be chosen such that the total measurement error incurred during measurement of the actual value of the external resistance is less than the spacing between adjacent ones of the specific resistor values. The circuit or IC may therefore reliably identify the nominal resistor value corresponding to the external resistor, allowing for more precise control of the output voltage by using the identified nominal resistor value.

The external resistor may be coupled to the converter circuit through a designated pin. An on-chip derived current may be applied to the external resistor, and the actual voltage developed across the external resistor may be digitized using an ADC to obtain a numeric representation of the actual voltage. The numeric value of the actual voltage may then be stored in a digital control block. The on-chip derived current may then be applied to a reference resistor, thereby developing a reference voltage across the reference resistor. The reference voltage may also be digitized using the ADC, and the numeric value of the reference voltage may also be stored in the digital control block. The value of the external resistor may then be determined by the digital control block according to the ratio of the external resistor to the reference resistor being equal to the ratio of the actual voltage to the reference voltage. The digital control block may also be operated to select the nominal resistance value corresponding to the external resistor, and to generate the voltage converter output voltage according to that nominal value.

In certain embodiments, the reference resistor may be a stable reference resistance calibrated during wafer probing, in the course of fabricating the voltage converter circuit/IC. Furthermore, the digital control block may be operated to compare the value obtained for the external resistor to individual values of resistors comprised in the set of specific resistor values, and a resistor with a value closest to the value of the external resistor may be selected as the nominal resistance value used by digital control block in controlling the output voltage. In other embodiments, the set of specific resistor values may be stored in a table, which may also be comprised in the digital control block. Also, in lieu of using the value of the selected resistor, its placement index in the table may be used by the digital control block for generating the output voltage.

Alternate embodiments may be implemented in the analog and/or digital domain, using an on-chip microcontroller and memory structures to perform calibration operations. In one embodiment, a reference current may be derived from a reference voltage and a reference resistance. In such embodiments, an actual voltage, which may be developed across the external resistor in response to applying the reference current, may be divided by the reference voltage, thereby obtaining the ratio of the actual resistor to the reference resistance. The reference voltage may be a temperature-compensated and process-insensitive reference voltage, and trimming of the reference resistance may be performed during a factory calibration routine. In yet other embodiments, different types of components, for example capacitors, may be used instead of resistors. Charging and discharging times may be used instead of voltage levels, to determine the output parameter settings.

Specifying a first external resistor as a 'coarse' value, and using an additional pin to couple an additional external resistor as a 'fine' value may lead to a higher number of potential values for the nominal resistance. The coarse and fine resistors may have similar tolerances. By using methods similar to those described above, a coarse nominal value by way of the coarse resistor may be provided for the controlled parameter. The ratio of the coarse external resistor to the fine external resistor may then be used to 'fine-tune' the controlled value relative to the coarse value. This may allow the external resistor errors to be substantially attenuated.

Other aspects of the present invention will become apparent with reference to the drawings and detailed description of the drawings that follow.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
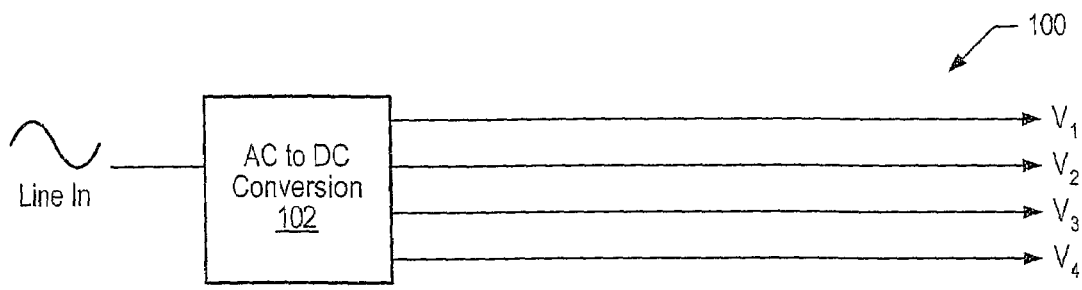
FIG. 1 shows one embodiment of a power distribution circuit according to prior art.
Figure 2:
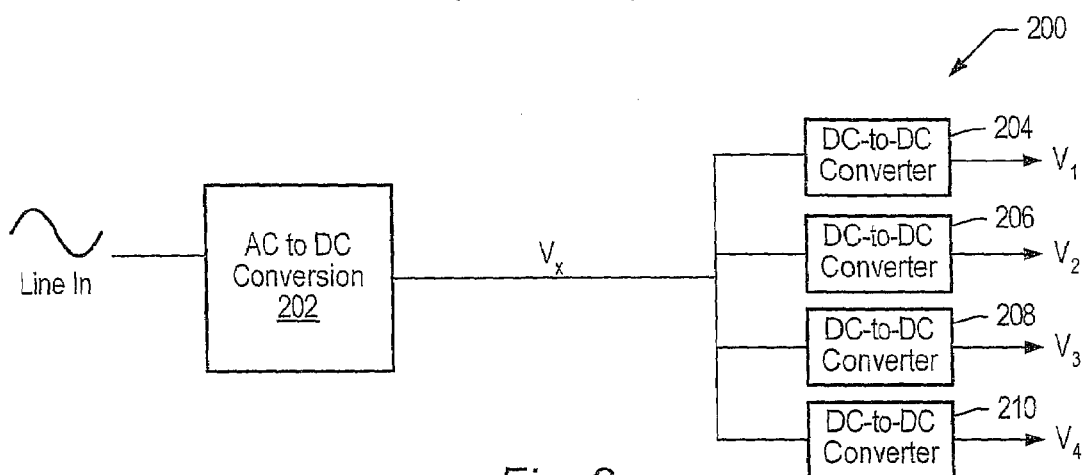
FIG. 2 shows a distributed power architecture (DPA) according to prior art.
Figure 3:
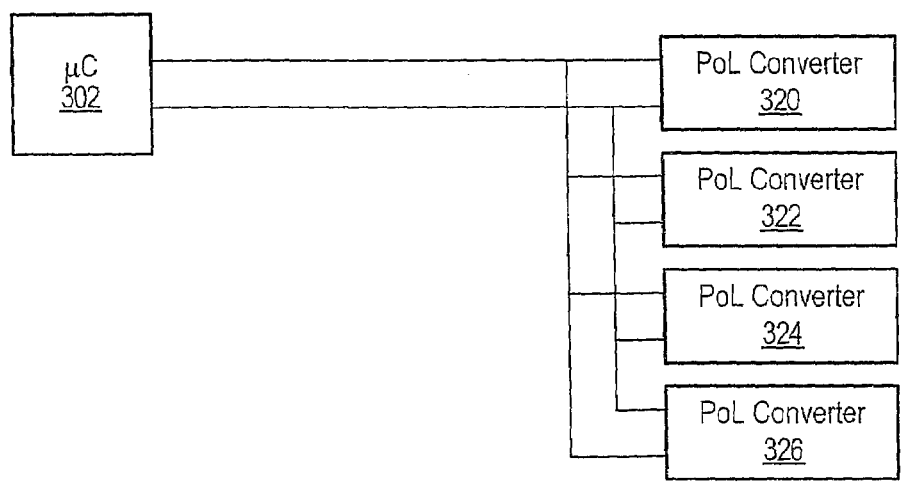
FIG. 3 shows one embodiment of a system in which a microcontroller communicates with POL converter devices over an I$^2$C bus, according to prior art.
Figure 4:
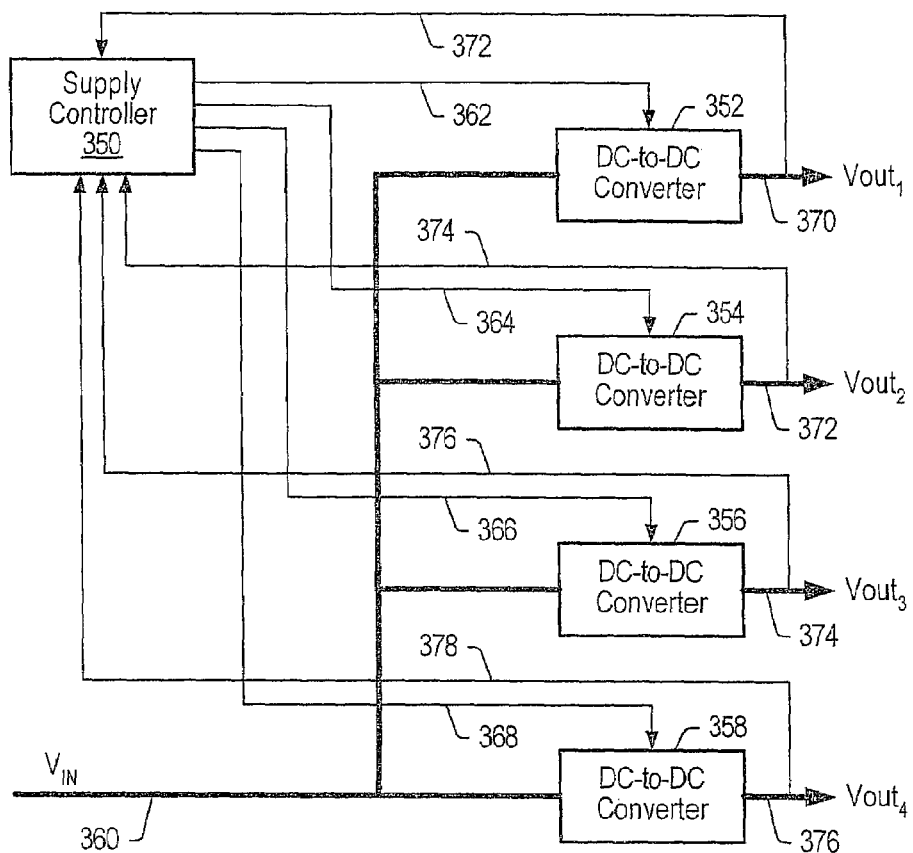
FIG. 4 shows one embodiment of a system in which DC-to-DC voltage converters are interconnected in a point-to-point configuration, controlled by a central supply controller to perform a specific function, according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF THE PREFERRED EMBODIMENTS

The following references are hereby incorporated by reference in their entirety as though fully and completely set forth herein:

U.S. Patent Application Publication No. 2004/0201279 (Ser. No. 10/820,976), titled "Method And Apparatus For Improved DC Power Delivery, Management And Configuration," filed Jun. 21, 2004.

U.S. patent application Ser. No. 11/198,698, titled "Method For Using a Multi-Master Multi-Slave Bus For Power Management," filed Aug. 5, 2005.

Figure 7:
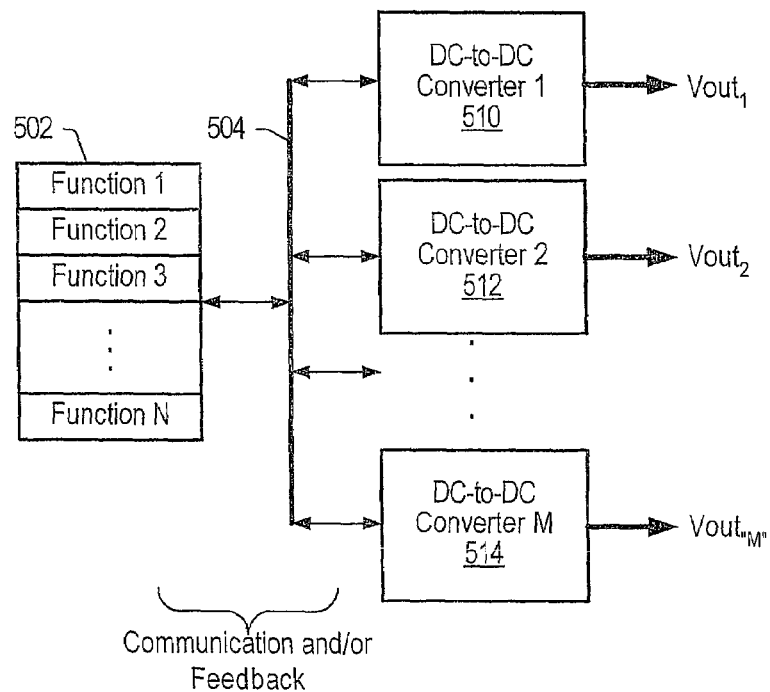
FIG. 7 shows one embodiment of a system featuring improved DC power delivery, management and configuration, according to principles of the present invention.
Figure 5:
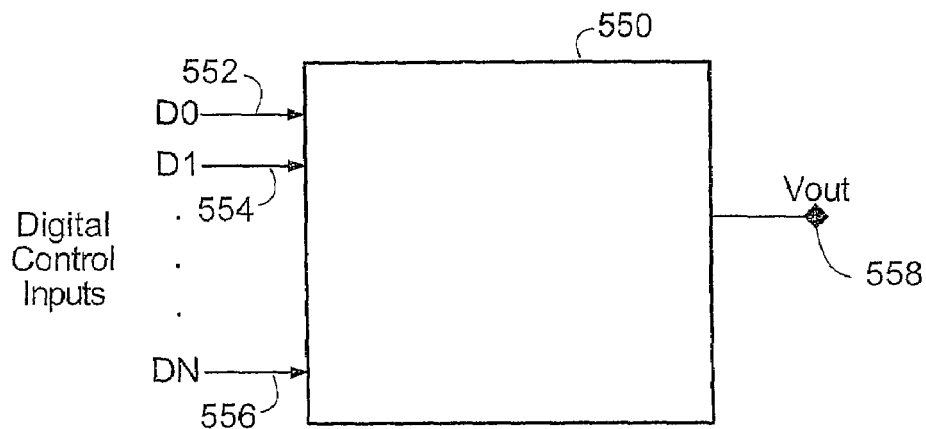
FIG. 5 shows one embodiment of the output voltage of a voltage regulator being controlled using control bits, according to prior art.

FIG. 7 is a block diagram of one embodiment of a power distribution system. As shown, the common functions required in a complex DC power system may be combined in a single controller rather than treated as separate IC functions. As illustrated in the embodiment of FIG. 7, a controller 502 managing functions 1 through N may be coupled to DC-to-DC converters 1 through M (illustrated by example as power converters 510, 512 and 514) via a digital bus 504. Digital bus 504 may be a serial bus enabling communication with reduced wiring requirements. In the configuration shown in FIG. 7, real-time communication is made possible between power converters 510, 512, and 514 and controller 502 by their being coupled to serial digital bus 504. It is noted, however, that in other embodiments the power converters may communicate with the controller 502 and with each other by other means, e.g., a parallel bus.

Figure 8:
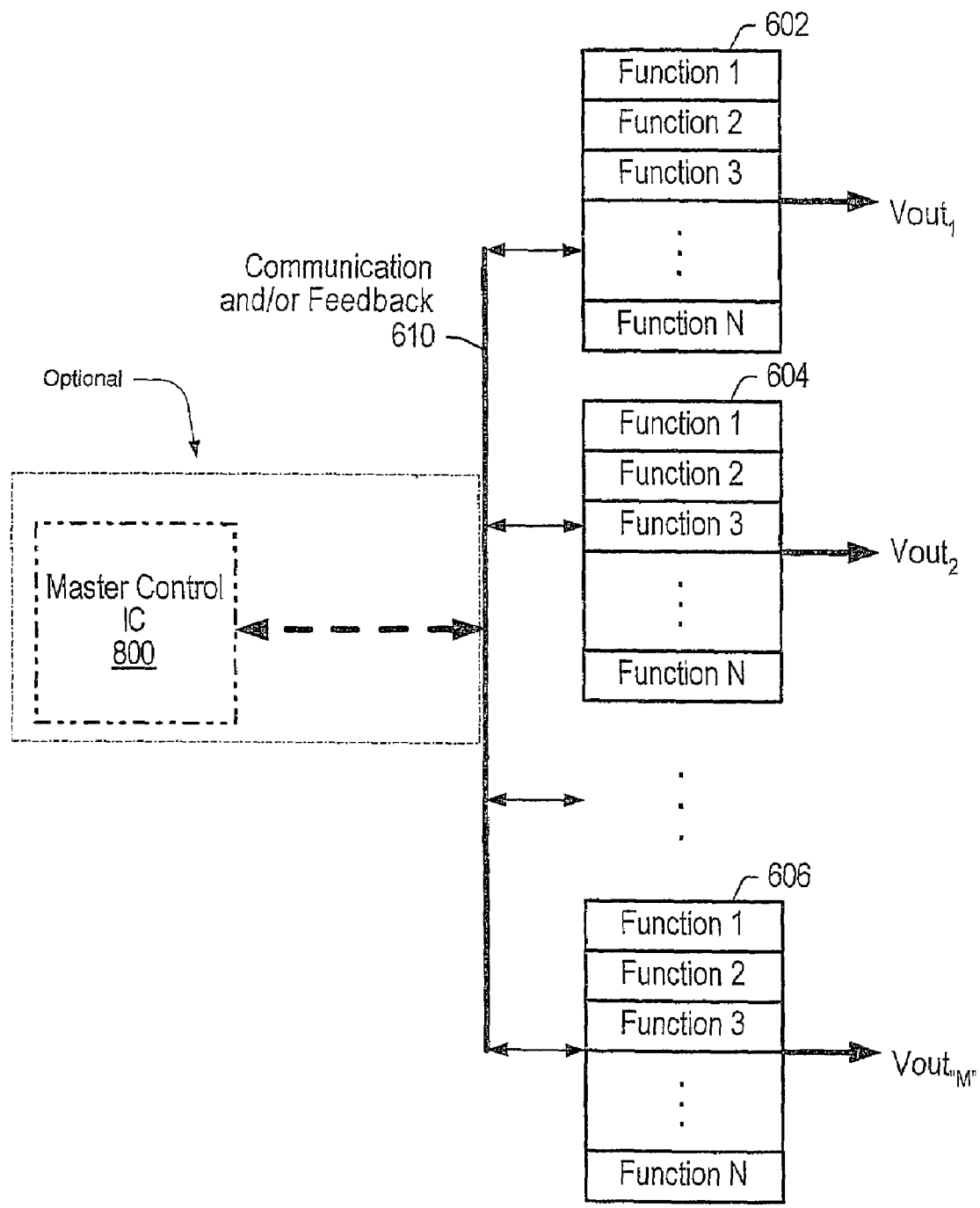
FIG. 8 shows the interconnection of digital power management devices (DPMDs) according to one embodiment of the present invention.

The illustrated embodiment of FIG. 8 provides a system-oriented solution using mixed-signal IC technology, allocating one unit of each function to a single point of load (POL) IC, or digital power management device (DPMD). In this embodiment, one DC-to-DC voltage converter, one unit of supply sequencing, one unit of load monitoring, and one respective unit of various other functions (previously discussed) are combined in each DPMD, e.g., in each of DPMD 602, DPMD 604, and DPMD 606.

As illustrated in the embodiment of FIG. 8, DPMDs 602, 604, and 606 have each been allocated Functions 1 through N, and are coupled together via serial digital bus 610. Bus 610 may be simpler than an I2C bus and may offer more control and signaling, including real-time data feedback capability. Bus 610 may also allow each DPMD to be coupled to a master control IC (MCIC) 800, or to be coupled only to each other, enabling all system level functions to be configured, controlled and monitored providing simple and flexible results. MCIC 800 is shown mostly for illustrative purposes, and preferred embodiments may omit MCIC 800 and only include DPMDs coupled to bus 610, where all required functions may be controlled by a single DPMD or a group of DPMDs operating together. By configuring each POL device or DPMD to have the ability to communicate with any other POL device or DPMD coupled to bus 610, each POL device or DPMD may act as either a master or a slave on bus 610, thereby obviating the need for MCIC 800 where it may be desirable to design a power delivery system without MCIC 800, or without any other similar central control unit.

Various embodiments, as illustrated in FIG. 8, provide a modular approach to designing DPA systems, providing system level functionality without requiring the system to be individually and separately configured for each desired function that may be required. Each DPMD may be individually configured prior to its being placed in the system, and may operate to perform all necessary functions by having access to real-time feedback information over bus 610, and by communicating with other DPMDs. This represents active control as opposed to simple status monitoring. Several devices may be enabled when the DPA system is configured as illustrated in the embodiment FIG. 8. Rather than just having a DC-to-DC converter, a DPMD may comprise a DC-to-DC converter, and any or all of the associated control, configuration and monitoring functions associated with a single node.

Figure 6:
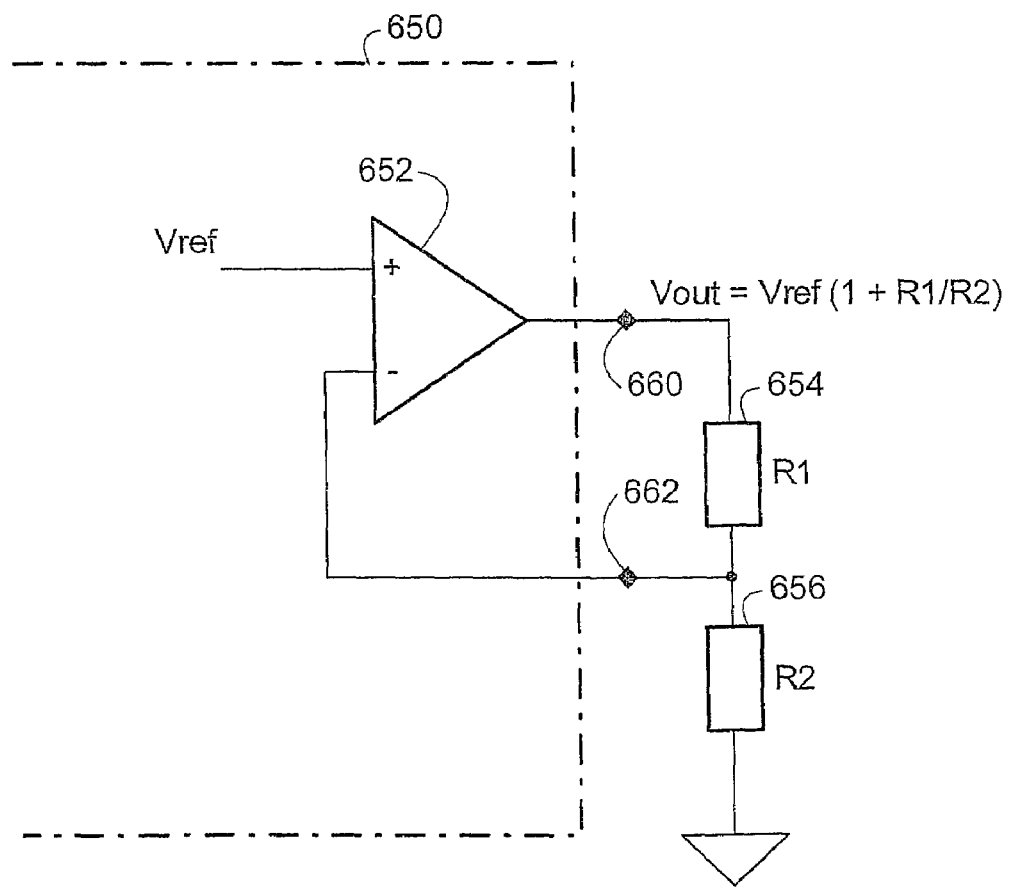
FIG. 6 shows one embodiment of the output voltage of a voltage regulator being controlled using resistors, according to prior art.

Considering the control of the value of each output voltage, for example $Vout_1$, $Vout_2$ and $Vout_3$ of POLs 602, 604 and 606, respectively, shown in FIG. 8, it may be advantageous to develop a method to substantially improve the accuracy of the voltage output, or output parameter according to which the voltage output may be generated, even with the use of inaccurate external components. Such a method may make it possible to prevent the resistor errors (referring back to FIG. 6) from affecting the output parameter.

Figure 9:
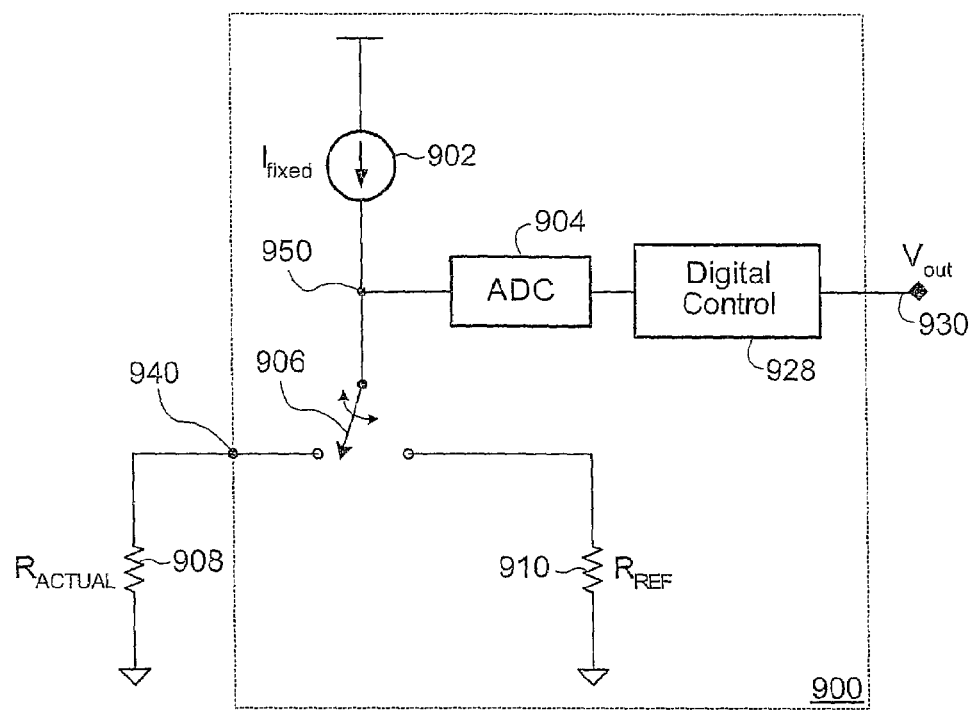
FIG. 9 shows one embodiment of a system configured to control the output voltage of a voltage regulator, according to principles of the present invention.

In one set of embodiments, a desired resistor value for generating a specific output voltage may be selected from a set of specific resistor values. The available resistor values may correspond to values of commercially available resistors that may physically be included in a voltage converter circuit. FIG. 9 shows a block diagram of one embodiment of a circuit 900 configured to accurately control output voltage $V_{out}$ 930—which may be an output voltage such as $Vout_1$, $Vout_2$ and/or $Vout_3$ shown in FIG. 8—using a single external resistor 908. Circuit 900 may be operated to measure actual resistor 908, and from the value of resistor 908 determine which of the specific resistor values must have previously been selected. This intended, or "ideal", resistor value—rather than actual resistance 908—may then be used to control the output voltage. The set of specific (or allowed) resistor values may be chosen such that the total measurement error incurred during measurement of actual resistance 908 is less than the spacing between adjacent ones of the specific resistor values. Circuit 900 may therefore reliably identify the selected, or ideal, resistor value corresponding to actual resistor 908. In other words, circuit 900 may operate to determine the nominal (intended) value of actual resistor 908.

Actual resistor 908 may be an external resistor (e.g. +/−5% tolerance) coupled to circuit 900, which may be comprised in an IC, through pin/node 940. An on-chip derived current $I_{fixed}$ 902 may be applied to external resistor $R_{ACTUAL}$ 908 by positioning switch 906 to couple resistor 908 to current source 902. The voltage developed across resistor 908 may be described as:

$$V_{ACTUAL} = I_{fixed} * R_{ACTUAL} \quad (1)$$

and may be digitized using ADC 904 to obtain a numeric representation of $V_{ACTUAL}$. The numeric value of $V_{ACTUAL}$ may be stored in digital control block 928. By flipping switch

906 to couple a reference resistor $R_{REF}$ 910 to current source 902, a reference voltage may be established across $R_{REF}$, where $$V_{REF} = I_{fixed} * R_{REF}. \tag{2}$$

$V_{REF}$ may also be digitized using ADC 904, and the numeric value of $V_{REF}$ may also be stored in digital control block 928. The value of resistor 908 may then be determined by digital control block 908 according to the relationship:

$$R_{ACTUAL} = R_{REF} * (V_{ACTUAL}/V_{REF}). \tag{3}$$

Digital control block may also be operated to select the nominal resistance value corresponding to $R_{ACTUAL}$ 908, and generate $V_{out}$ 930 according to that nominal value.

$R_{REF}$ may be a stable reference resistance calibrated during wafer probing, in the course of fabricating circuit/IC 900. In addition, the signal to noise ratio (SNR) of circuit 900 may be improved by maximizing $I_{fixed}$ 902 without saturating ADC 904. In one embodiment, digital control block 928 may operate to compare the value obtained for $R_{ACTUAL}$ 908 to individual values of resistors comprised in the set of specific resistor values, and a resistor with a value closest to the value of $R_{ACTUAL}$ 908 may be selected as the nominal resistance value used by digital control block in controlling $V_{out}$ 930. In other embodiments, the set of specific resistor values may be stored in a table, which may also be comprised in digital control block 928. Furthermore, in lieu of using the value of the selected resistor, its placement index in the table may be used by digital control block 928 for generating $V_{out}$ 930. For example, if specific resistor values from 470 Ohms to 200 Kilo-Ohms were chosen such that each resistor is 10% larger than the previous resistor, 64 accurate output parameter settings may be achieved with a one-pin interface (in this case pin 940).

Figure 10:
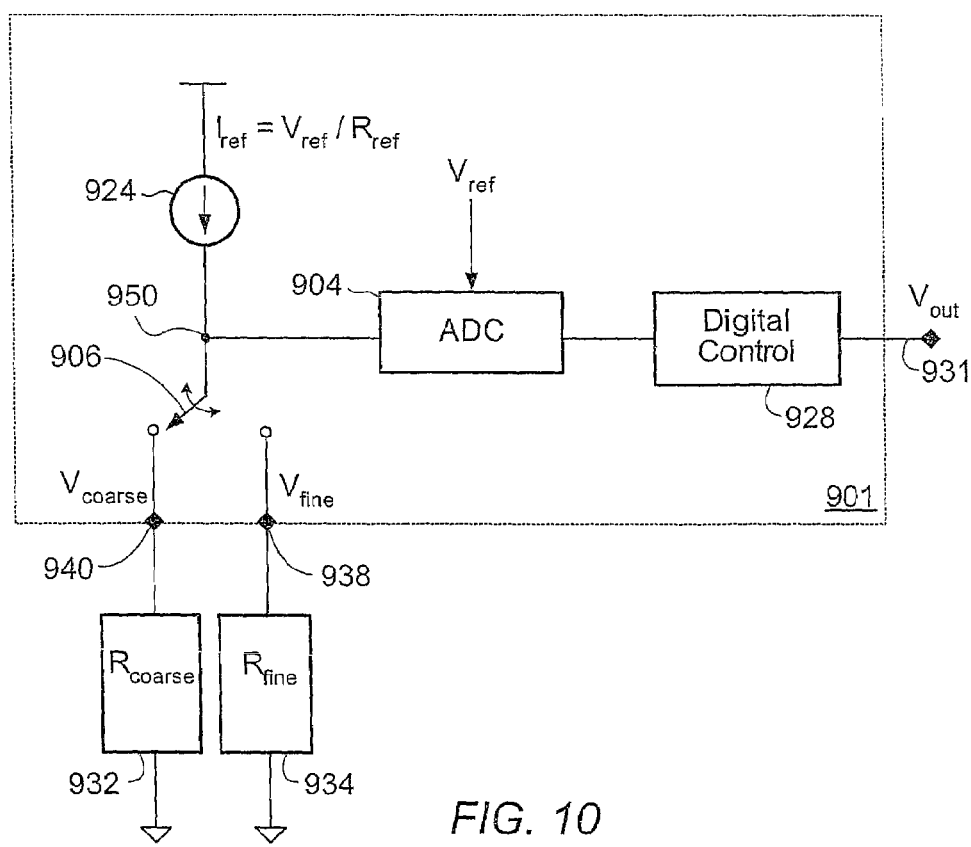
FIG. 10 shows one embodiment of a system configured to control the output voltage of a voltage regulator with an increased number of achievable output voltage values, according to principles of the present invention.

While FIG. 9 shows one embodiment, alternate embodiments may be implemented in the analog and/or digital domain, using an on-chip microcontroller and memory structures to perform calibration operations. In one embodiment, a reference current $I_{REF}$ (such as $I_{REF}$ 924 in FIG. 10) may be derived from a reference voltage $V_{REF}$ and a reference resistance (similar to $R_{REF}$ 910 from FIG. 9). In such embodiments, $I_{REF}$ may be generated as $$I_{REF} = V_{REF}/R_{REF}, \tag{4}$$

as shown in FIG. 10, for example. A voltage developed across the actual resistor (such as $R_{coarse}$ 932 in FIG. 10, for example) in response to applying $I_{REF}$ may be divided by the reference voltage $V_{REF}$, thereby obtaining the ratio $$R_{ACTUAL}/R_{REF}. \tag{5}$$

$V_{REF}$ may be a temperature-compensated and process-insensitive reference voltage, and trimming of $R_{REF}$ may be performed during a factory calibration routine. In yet other embodiments, different types of components, for example capacitors, may be used instead of resistors. Charging and discharging times may be used instead of voltage levels, to determine the output parameter settings.

In the embodiments described above, the output parameter may be discretely controlled depending on the choice of resistor $R_{ACTUAL}$ 908, thus providing a solution for a smaller number of achievable values. For a higher number of values, the range of specified resistors may become impractical. FIG. 10 shows one embodiment where a higher number of values may be achieved by specifying a first external resistor $R_{coarse}$ 932 as a 'coarse' value, and using additional pin 938 coupling additional external resistor $R_{fine}$ 934, which may have a tolerance similar to $R_{coarse}$ 932. By using the system and methods as previously described, a coarse value by way of resistor $R_{coarse}$ 932 may be provided for the controlled parameter. The ratio of the two external resistors $R_{coarse}$ 932 and $R_{fine}$ 934 may then be used to 'fine-tune' the controlled value relative to the coarse value. This may allow the external resistor errors to be substantially attenuated. The hardware comprised on chip (or circuit) 901 may be multiplexed between $R_{coarse}$ 932 and $R_{fine}$ 934 to give two output voltage values:

$$V_{coarse} = V_{REF} * (R_{coarse}/R_{REF}), \text{ and} \tag{6}$$

$$V_{fine} = V_{REF} * (R_{fine}/R_{REF}), \tag{7}$$

at nodes 940 and 938, respectively.

$R_{coarse}$ 932 may have discrete values as previously described. $R_{fine}$ 934 may be selected to be of any value. The final output voltage (or controlled parameter) $V_{out}$ 931 may then be defined as:

$$V_{out} = A * V_{coarse\_ideal} + B * V_{fine}, \text{ where} \tag{8}$$

$$V_{coarse\_ideal} = V_{REF} * (R_{coarse\_ideal}/R_{REF}). \tag{9}$$

Here, $V_{coarse\_ideal}$ may represent a 'coarse' value obtained according to the previously described methods (equivalent for example to $V_{out}$ 930 in FIG. 9), not be responsible for introducing any errors to the final controlled parameter $V_{out}$ 931. $V_{fine}$ may reflect an error corresponding to the error that may be introduced in $R_{fine}$. However, selecting 'B' to have a value considerably smaller than that of 'A', the effect of this error on $V_{out}$ 931 may be reduced. Since the selection of $R_{coarse}$ (and hence $V_{coarse\_ideal}$) may make it possible to bring the controlled parameter close to the desired value, $B * V_{fine}$ may represent a small difference value that may be used to adjust the controlled parameter (and hence $V_{out}$ 931), and bring it to the actual desired value. In one set of embodiments, A and B may be chosen as follows:

$$A = 1 - 1/N, \text{ and} \tag{10}$$

$$B = 1/N. \tag{11}$$

For example, choosing N=10 would result in A=0.9 and B=0.1. The value of 'B' being considerably less than 1, the $V_{fine}$ error (and hence the $R_{fine}$ error) may only have a small affect on the controlled parameter, and hence on $V_{out}$ 931.

As further improvement, $R_{fine}$ 934 may be configured to specify either a positive or negative 'correction' to the coarse value, thereby further reducing the value of 'B', and consequently reducing the output error contributed by the $R_{fine}$ error. This improvement may be expressed in the following relationship:

$$V_{out} = A * V_{coarse\_ideal} + B_S * (V_{fine}/V_{coarse} - 1) \tag{12}$$

Values of $R_{fine}$ 934 (and hence $V_{fine}$) may be selected by the user (e.g. from $R_{fine}$=0 to $2*R_{coarse}$) to generate a 'fine' adjustment of $+B_S$. This method may also allow $R_{fine}$ 934 to be measured relative to $R_{coarse}$ 932, rather than relative to $R_{REF}$, and only their ratio may need to be considered. Thus, when operating IC 901, arbitrarily accurate resistors may be selected, while the parameter accuracy may be maximized without being limited by the accuracy of on-chip $R_{REF}$ (for example, $R_{REF}$ 910 as shown in FIG. 9). The relative measurement may be performed in two steps. In the first step, fixed current $I_{REF}$ 924 may be applied to $R_{coarse}$ 932, and $V_{coarse}$ may be measured at node 940 using ADC 904. In the second step, $I_{REF}$ 924 may be applied to $R_{fine}$ 934, and $V_{fine}$ may be measured at node 938 using ADC 904. The ratio of the two results produced by ADC 904 would be equivalent to $R_{fine}/R_{coarse}$, (and hence to $V_{fine}/V_{coarse}$). In one set of embodiments, the measurement error may be reduced by 'auto-gaining' the measurements performed using ADC 904. As previously mentioned, $I_{REF}$ 924 may be configured to be programmable, and may be programmed to the maximum available current that does not saturate ADC 904 during the measurements, thereby reducing errors incurred during measurements performed using ADC 904.

It should be noted, that while the embodiment in FIG. 10 shows only two resistors, $R_{coarse}$ 932 and $R_{fine}$ 934, alternate embodiments (not shown) may include more resistors to further fine-tune the control of $V_{out}$ 931, or the control of any other chosen, specified parameter. The position of each resistor may represent a power of the number corresponding to the number of different specified nominal values that each resistor may have, from the least significant bit (LSB; typically '0') corresponding to the position of the finest resistor value, to the most significant bit (MSB) corresponding to the position of the coarsest resistor value. In addition, when multiple resistors are used, each resistor may be mapped to its nearest nominal value, and combined into a function to control a selected parameter. The function may be a function of the nominal resistors, a function of the index of the nominal resistors in a table, or some generic function, such as a look-up table.

For example, equation 8 may be modified to include the nominal value of $V_{fine}$, and rewritten as follows:

$$V_{out} = A*V_{coarse\_ideal} + B*V_{fine\_ideal}. \quad (13)$$

For multiple resistors, in addition to $R_{fine}$ 934 and $R_{coarse}$ 932, additional resistors may be configured in the embodiment of FIG. 10, where each resistor may be selectively coupled to current source 924 via switch 906. Thus, in lieu of one 'coarse' resistor and one 'fine' resistor, 'n' number of resistors (R1, R2 . . . Rn) may be configured next to each other, each selectively coupled to current source 924 via switch 906. Equation 13 may be then be expanded as follows:

$$V_{out} = K1*V_{R1\_ideal} + K*V_{R2\_ideal} + \ldots + Kn*V_{Rn\_ideal}. \quad (14)$$

More generally, any parameter 'P' or state inside the integrated circuit may be controlled through a function of the combination of nominal values obtained/measured for R1 through Rn. For example, clock frequency, currents, and delay times may likewise be controlled in addition to controlling output voltage. In general, control of a chosen parameter 'P' within the integrated circuit, using external components EC1 through ECn, where the external components may be resistors, capacitors, etc. may be described by:

$$P = Function(EC1\_ideal, EC2\_ideal \ldots ECn\_ideal). \quad (15)$$

When using resistors, for example in the embodiments shown in FIGS. 9 and 10, equation 15 may be narrowed as:

$$P = Function(R1\_ideal, R2\_ideal \ldots Rn\_ideal). \quad (16)$$

As also previously mentioned, instead of using the nominal values of the components themselves, the nominal values may each have a corresponding index in a table, and the function may use those index values, or the nominal values may themselves be mapped to functions, which may be combined into a single function to control the desired parameter.

Furthermore, alternate embodiments may feature a least part of the functions in the analog domain. For example, in both FIG. 9 and FIG. 10, ADC 904 may be replaced by a voltage divider, with one input of the divider being provided the voltage at node 950, and another input of the divider being provided a reference voltage, which may be a temperature-compensated process-insensitive reference voltage. In such embodiments, the output of the divider may represent the ratio of the external resistance (in FIG. 9 resistor 908, and in FIG. 10 either resistor 932 or 934—depending on which one is coupled to current source 924) to the internal reference resistance (for example $R_{REF}$ 910 in FIG. 9, or $R_{REF}$ indicated in FIG. 10), from which the value of the external (actual) resistance may be determined and a corresponding nominal value for the actual resistance may be selected.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A method for controlling a parameter in a circuit, the method comprising:
   configuring a circuit component to affect the parameter;
   measuring an actual value of a characteristic of the circuit component;
   selecting, from a plurality of values of the characteristic of the circuit component, a nominal value of the characteristic of the circuit component, wherein the nominal value corresponds to the actual value; and
   adjusting the parameter according to the nominal value.

2. The method of claim 1, wherein a difference between each adjacent value of the plurality of values is greater than a measurement error incurred during said measuring the actual value.

3. The method of claim 1, wherein said selecting and at least a portion of said adjusting is implemented in firmware.

4. The method of claim 1, wherein the circuit component is one of:
   a resistor, wherein the characteristic is resistance; and
   a capacitor, wherein the characteristic is capacitance.

5. The method of claim 1 further comprising storing the plurality of values in a table;
   wherein said adjusting the parameter according to the nominal value comprises adjusting the parameter based on an index number that corresponds to the nominal value's placement in the table.

6. The method of claim 1, wherein said adjusting the parameter according to the nominal value comprises adjusting the parameter according to a function of the nominal parameter.

7. The method of claim 1, further comprising performing said configuring, said measuring, and said selecting for each of a plurality of circuit components to obtain a plurality of nominal values;
   wherein said adjusting the parameter according to the nominal value comprises adjusting the parameter according to a function of the obtained plurality of nominal values.

8. The method of claim 1, wherein the parameter is one or more of:
   a voltage;
   a clock frequency;
   a current; and
   a delay time.

9. A system for controlling a circuit parameter, the system comprising:
- a first circuit operable to measure an actual value of a characteristic for each respective one of a plurality of circuit components, wherein the circuit components are configured to affect the circuit parameter; and
- a second circuit configured to couple to the first circuit and operable to select a subset of nominal values from a plurality of nominal values of the characteristic, wherein each respective one of the subset of nominal values corresponds to the measured actual value of one or more respective ones of the plurality of circuit components;
- wherein the second circuit is operable to adjust the parameter according to the subset of nominal values.

10. The system of claim 9, wherein a difference between each adjacent value of the plurality of nominal values is greater than any respective measurement error incurred during the first circuit measuring each actual value.

11. The system of claim 9, wherein the second circuit is operable to adjust the parameter according to a function of the subset of nominal values.

12. The system of claim 9, wherein the system is comprised on an integrated circuit.

13. A system comprising:
an integrated circuit; and
one or more circuit components operable to couple to the integrated circuit and to affect one or more operating parameters of the integrated circuit;
wherein the integrated circuit comprises:
- a first circuit operable to measure an actual value of a characteristic for each respective one of the one or more circuit components; and
- a second circuit configured to couple to the first circuit and operable to select a subset of nominal values from a plurality of nominal values of the characteristic, wherein each respective one of the subset of nominal values corresponds to the measured actual value of one or more respective ones of the one or more circuit components;
- wherein the second circuit is operable to adjust the one or more operating parameters according to the subset of nominal values.

14. The system of claim 13, wherein a difference between each adjacent value of the plurality of values is greater than any respective measurement error incurred during the first circuit measuring each actual value.

* * * * *